| | | |
|---|---|---|

United States Patent
Brown et al.

(10) Patent No.: US 6,939,491 B2
(45) Date of Patent: Sep. 6, 2005

(54) FOAM IN PLACE URETHANE FOR STRUCTURAL HEADLINERS

(75) Inventors: Bari William Brown, Ann Arbor, MI (US); George Bernard Byma, Clarkston, MI (US)

(73) Assignee: Lear Corporation, Southfield, MI (US)

( * ) Notice: Subject to any disclaimer, the term of this patent is extended or adjusted under 35 U.S.C. 154(b) by 50 days.

(21) Appl. No.: 10/324,444

(22) Filed: Dec. 19, 2002

(65) Prior Publication Data

US 2003/0155678 A1 Aug. 21, 2003

Related U.S. Application Data

(60) Provisional application No. 60/357,930, filed on Feb. 18, 2002.

(51) Int. Cl.[7] .............................................. B29C 44/06
(52) U.S. Cl. ...................... 264/46.4; 264/252; 264/254; 264/278
(58) Field of Search ............................... 264/46.4, 278, 264/252, 254

(56) References Cited

U.S. PATENT DOCUMENTS

| | | |
|---|---|---|
| 4,247,586 A | 1/1981 | Rochlin |
| 4,330,584 A | 5/1982 | Doerer |
| 5,411,688 A | 5/1995 | Morrison et al. |
| 5,484,186 A | 1/1996 | Van Order et al. |
| 5,582,906 A | 12/1996 | Romesberg et al. |
| 5,608,957 A | 3/1997 | Hanagan |
| 5,804,262 A | 9/1998 | Stevens et al. |
| 5,833,304 A | 11/1998 | Daniel et al. |
| 5,845,458 A | 12/1998 | Patel |
| 5,851,459 A | 12/1998 | Chen |
| 5,985,189 A | 11/1999 | Lynn et al. |
| 6,068,802 A | 5/2000 | Berghorn et al. |
| 6,086,145 A | 7/2000 | Wandyez |
| 6,120,090 A | 9/2000 | Van Ert et al. |
| 6,126,228 A | 10/2000 | Davis, Jr. et al. |
| 6,150,287 A | 11/2000 | Boyd et al. |
| 6,210,613 B1 | 4/2001 | Stein et al. |

(Continued)

FOREIGN PATENT DOCUMENTS

| | | |
|---|---|---|
| DE | 36 37 548 A1 | 5/1988 |
| DE | 197 54 180 A1 | 6/1998 |
| DE | 197 09 016 A1 | 9/1998 |
| DE | 199 51 659 A1 | 5/2001 |
| DE | 199 55 167 A1 | 5/2001 |
| EP | 0 668 476 A1 | 8/1995 |
| EP | 1038649 A2 | 9/2000 |
| GB | 1510300 | 5/1978 |
| GB | 2296887 A | 7/1996 |
| JP | 63-176757 | 7/1988 |
| JP | 5038725 A | 8/1991 |
| JP | 2001038789 A | 7/1999 |

*Primary Examiner*—Allan R. Kuhns
(74) *Attorney, Agent, or Firm*—Bill C. Panagos

(57) ABSTRACT

A method for forming a headliner assembly includes forming a main body blank having a periphery in a shape corresponding to a desired shape of the headliner assembly, the mold has a correspondingly shaped surface with a recess including an intermediate wall portion. The method includes introducing foam into the recess to simultaneously form at least one foam beam enclosing a selected component area, and join the at least one beam to the main body. The intermediate wall can be an accessory, and the beam may be formed to surround the component area. Additional foam application may be included to acoustically control the headliner's response to buzz, squeaks and rattles.

16 Claims, 3 Drawing Sheets

U.S. PATENT DOCUMENTS

| | | |
|---|---|---|
| 6,210,614 B1 | 4/2001 | Gardner, Jr. et al. |
| 6,273,499 B1 | 8/2001 | Guyon |
| 6,322,658 B1 | 11/2001 | Byma et al. |
| 6,357,812 B1 | 3/2002 | Adachi et al. |
| 6,368,702 B1 | 4/2002 | Erickson |
| 6,371,548 B1 | 4/2002 | Misaras |
| 6,378,936 B1 | 4/2002 | Grimm et al. |
| 6,379,595 B1 | 4/2002 | Byma et al. |
| 6,383,320 B1 | 5/2002 | Gebreselassie et al. |
| 6,398,995 B1 | 6/2002 | Eisenlord et al. |
| 6,409,947 B1 | 6/2002 | Wandyez |
| 6,413,613 B1 | 7/2002 | Byma |
| 6,451,232 B2 * | 9/2002 | Barber et al. .............. 264/46.4 |
| 6,483,048 B1 * | 11/2002 | Bontrager et al. .......... 200/5 R |
| 2001/0042935 A1 | 11/2001 | Barber et al. |
| 2002/0017734 A1 | 2/2002 | Sugihara et al. |

* cited by examiner

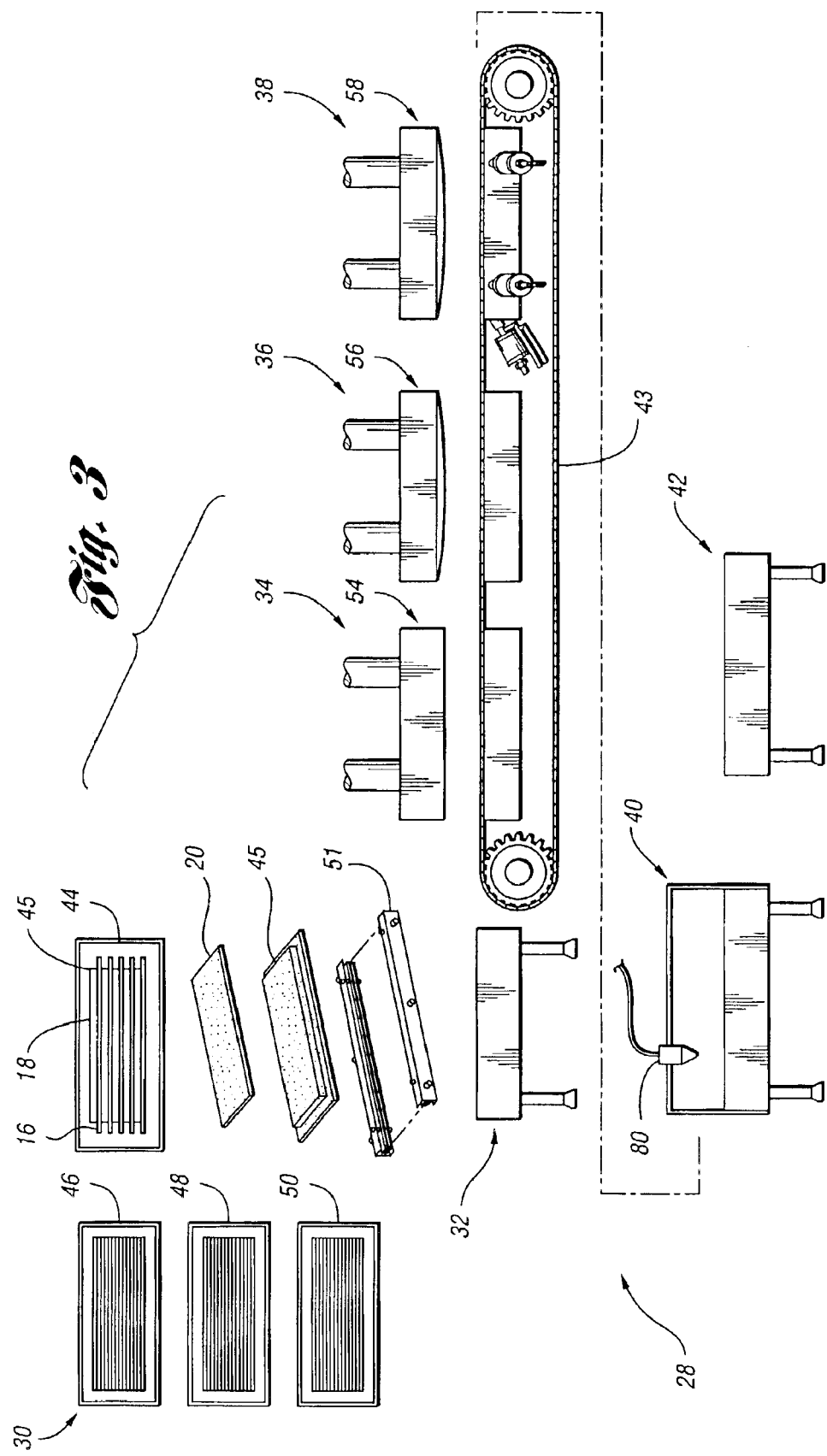

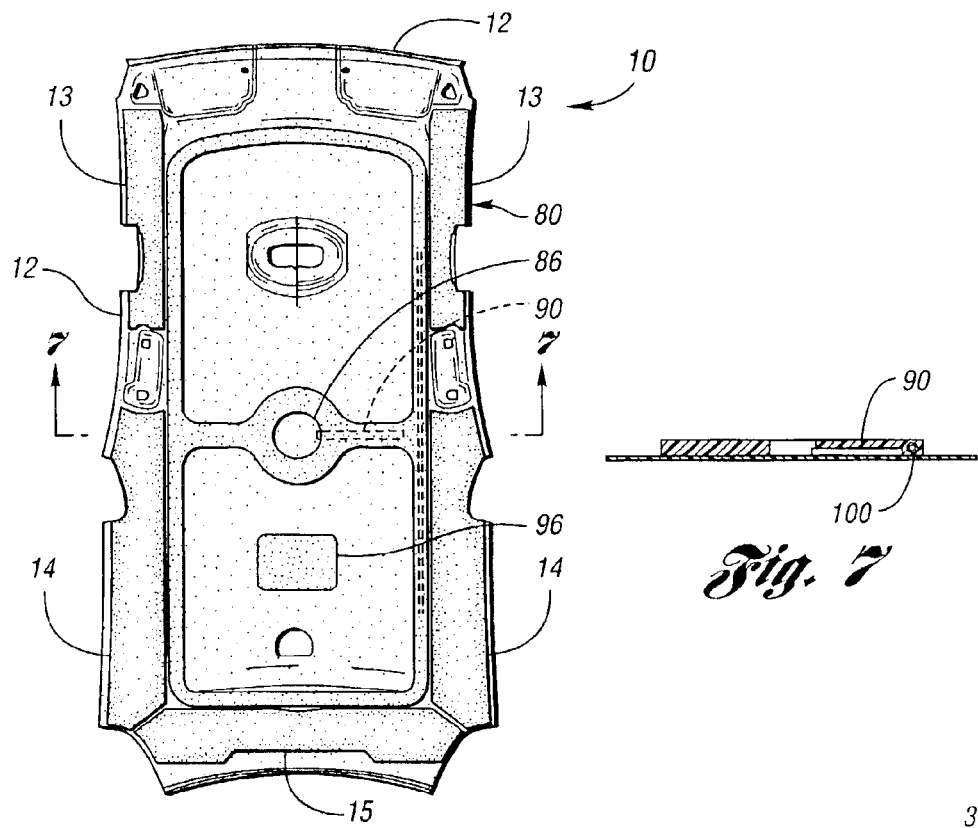
Fig. 5
Fig. 7
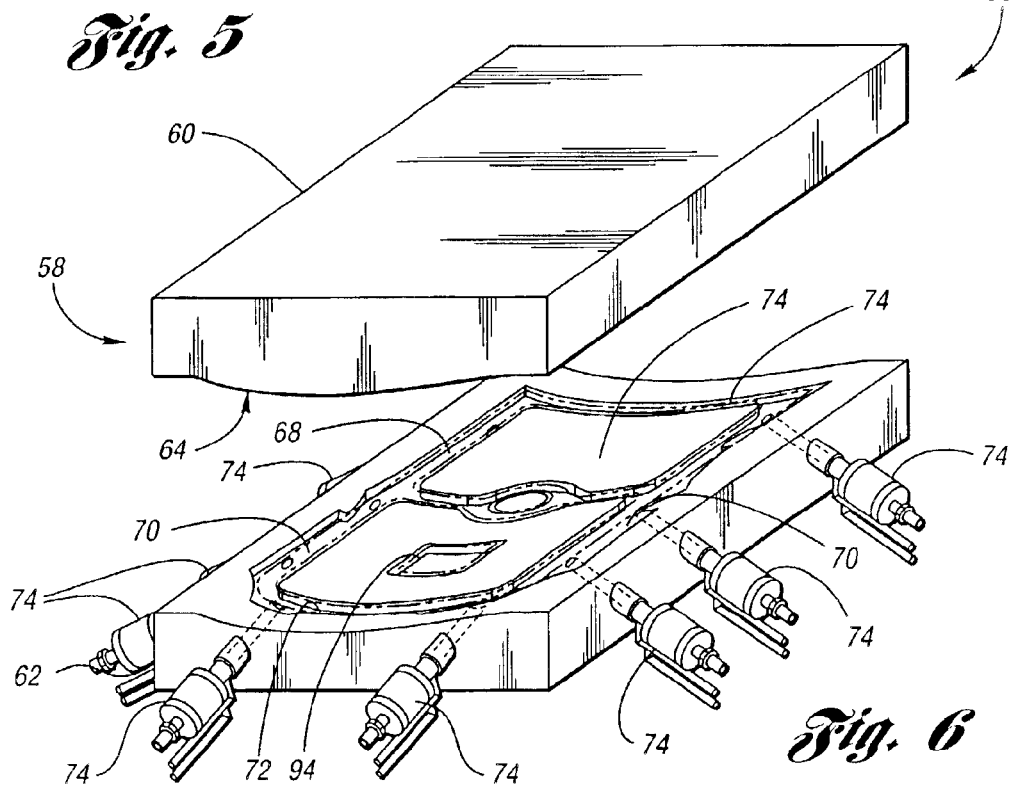
Fig. 6

US 6,939,491 B2

FOAM IN PLACE URETHANE FOR STRUCTURAL HEADLINERS

This application claims the benefit of provisional application 60/357,930, filed Feb. 18, 2002.

BACKGROUND OF THE INVENTION

1. Field of the Invention

The invention relates to a method for forming headliners having shaped structural foam beams.

2. Background Art

The covering of the interior surface of a vehicle roof panel is known as a headliner, and may be made and installed in numerous ways. One prior method of making a headliner assembly placed energy absorbing foam pads in the headliner. The pad forming process included molding a block of foam, slicing the block into panels, die-cutting the panels, and compression molding the panels to form the pads. The pads are then attached to a preformed headliner body using assembly dies and an adhesive. Because of the multiple steps involved with forming the pads and attaching the pads to the headliner, this method is time consuming, labor intensive and costly, and also results in significant material waste.

U.S. Pat. No. 5,845,458 discloses another method of making a headliner having deformable foam inserts disposed on side edges of the headliner. The method includes positioning a cover layer, a foam panel, and preformed foam inserts in a mold, and draping a flexible backing layer over the foam panel and foam inserts. Suitable adhesives are also positioned between the cover layer and the foam panel, and between the foam panel and the foam inserts. The mold is then closed to compression mold the foam panel and foam inserts, as well as to stiffen the backing layer. However, this method also involves multiple steps for forming the inserts and attaching the inserts to the remainder of the headliner, complicating and increasing the expense of headliner production.

Another known process applies foam in place technology to provide energy absorbing pads at likely contact areas adjacent to impactable structures, such as roof panel edges. The known method for forming a headliner assembly includes simultaneously forming an energy absorbing member at the likely contact areas and joining the energy absorbing member to a main body of the headliner assembly proximate to the periphery of the body. While the method significantly reduces time and manufacturing costs compared with prior methods for locating and attaching energy absorbing foam pads proximate the periphery of headliners, the method complicates the headliner structure and the handling during production and installation because of the localized pads.

Another known development forms structural beams of foam extending across a major dimension of the headliner. Although such beams can reinforce the headliner to reduce flexing during handling and reduce the difficulty of installing the headliner, the beams are not configured or located for support of accessories or components on the headliners, and are not aligned to address localized acoustic problems.

SUMMARY OF THE INVENTION

The present invention overcomes the above disadvantages by providing a method for forming a headliner assembly or other internal finish panel having a foam in place structural member joined to a main body and shaped at a location or selected area identified for accessories or acoustic response.

According to one embodiment of the invention, a method for forming a headliner assembly includes forming a main body in a shape corresponding to a desired shape of the headliner assembly; positioning the main body in a mold having at least one recess with an intermediate wall; closing the mold; and injecting foam into the recess to simultaneously form a beam shaped to border an accessory area within the support beam and joined to the main body. The beam may be across a major dimension of the main body, and as used in this application, the terms major dimension refer to an elongated but not necessarily linear distance extending along a length, a width or a diagonal of a vehicle roof area, and extending beyond a midpoint of at least one of the length and the width of the area and toward a point near, but not necessarily at, the ends of the vehicle roof section being covered by the headliner. When the selected area need not be open to receive accessories, the intermediate wall may be a component, such as a wiring harness, that becomes embedded in the beam.

By using a mold having multiple recesses, a headliner assembly may be formed with multiple support beams. Similarly, if the recesses are joined in fluid communication, the beams may be joined to form a frame over a major area of the vehicle roof. A major area as used in this description refers to an expanse of surface area not necessarily rectangular extending beyond a midpoint of the roof area and along at least two of a length, a width, and a diagonal of the roof area toward, but not necessarily at, the ends of the vehicle roof section being covered by the headliner. According to another embodiment of the invention, foam may be injected simultaneously or sequentially into one or more recesses, and the foams may have different densities and/or chemistries. Alternatively, the mold in place operation may involve other processes for introducing foam into the recesses of a lower mold part. Regardless of how the foam is introduced to the recess or recesses in the mold parts, the beam protects or supports accessories at the headliner. Moreover, the foam may be shaped by recesses to form pads located as desired, for example, between beams or within framed areas, to affect acoustic energy such as buzzes, squeaks and rattles by means of the headliner.

When the beam is shaped to surround a component area, the beam may provide important protection for the component or may support the component. Similarly, wiring may be embedded in a beam for mounting the wiring in position. In addition, headliner areas, for example, areas intermediate beams, or enclosed by a frame of beams may be provided with molded pads of acoustically damping foam or other foam chemistries that reduce buzzes, squeaks and rattles (BSR).

BRIEF DESCRIPTION OF THE DRAWINGS

The present invention will be better understood by reference to the following detailed description of a preferred embodiment when read in conjunction with the accompanying drawing, in which like reference characters refer to like parts throughout the views, and in which:

FIG. 3 is a schematic view of a production-line arrangement for manufacturing the headliner assembly;

FIG. 5 is a top view of a headliner assembly showing modified beam structure according to the present invention;

FIG. 6 is a perspective view of the mold having recesses for forming the foam beams shown on the headliner of FIG. 5; and FIG. 7 is a sectional view taken substantially along the line 7—7 in FIG. 6.

DETAILED DESCRIPTION OF THE PREFERRED EMBODIMENT

Figure 1:
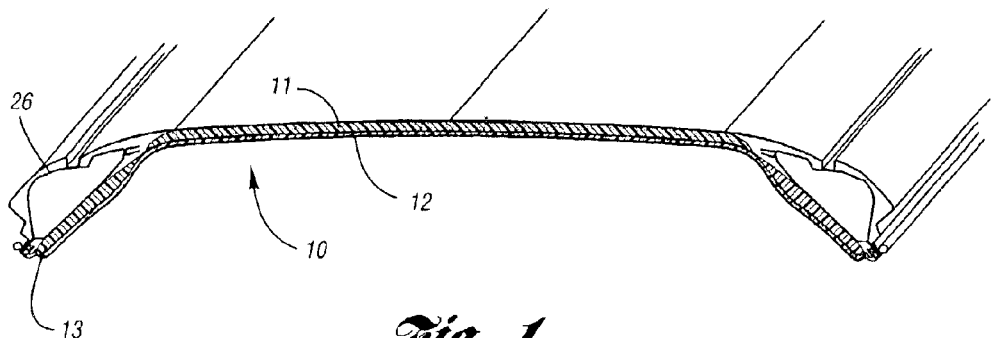
FIG. 1 is a sectional, perspective view of a headliner assembly according to the present invention.
Figure 2:
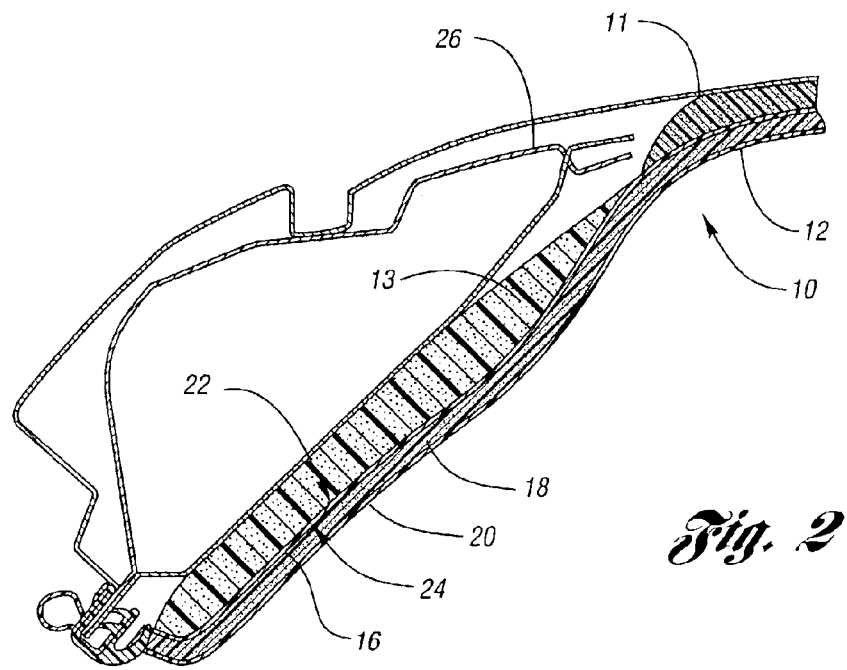
FIG. 2 is an enlarged fragmentary sectional view of the headliner assembly of FIG. 1.

Referring first to FIGS. 1, 2 and 5, a headliner assembly 10 according to the invention is adapted to be mounted to a roof 11 of a motor vehicle. The headliner assembly 10 includes a main body 12 that is reinforced by at least one and preferably, a plurality of structural foam beams. In the preferred embodiment, a forward beam 13, a mid beam 14, a rear beam 15 and longitudinal beams 17 and 19 are formed on and joined to the main body 12 near the periphery of the main body 12. The main body 12 has a first or backing layer 16, a second or substrate layer 18 and a cover layer 20. The backing layer 16 is preferably a relatively stiff, semi-flexible scrim layer, and has a first or upper surface 22 that is positioned proximate the interior surface of the roof 11 of the vehicle, and a second or lower surface 24. The substrate layer 18 is attached to the lower surface 20 of the backing layer 16, such as with an adhesive. Nevertheless, changes in the structure forming the substrate 18 are also within the scope of the present invention.

While the main body 12 and the substrate layer 18 may comprise any suitable material, in the preferred embodiment illustrated, the substrate layer 18 preferably comprises a thermoformable rigid urethane layer sandwiched between two fiberglass layers. The cover layer 20 may be any suitable cover material, such as cloth, vinyl or foam backed leather, and provided with or without a padding layer depending upon the use characteristics required. The cover layer 20 is attached to the substrate layer 18, preferably with an adhesive. Alternatively, the headliner assembly 12 may be manufactured without a backing layer 16 and/or a cover layer 20 if not required for a particular application.

The front beam 13, mid beam 14, rear beam 15 and side beams 17 and 19 may be disposed proximate or inwardly of peripheral portions of the roof 11 when the headliner assembly 10 is mounted to the roof 11. For example, as shown in FIGS. 1, 2 and 5, the beams 17 and 19 are disposed proximate side rails 26 of the roof 11 when the headliner assembly 10 is mounted to the roof 11, such that the beams are positioned interiorly of the side rails 26. The number of beams, and the size and shape of each beam may be varied depending on the application. Nevertheless, at least one of the beams, for example, mid beam 14, includes a mid portion 84 that borders a selected component area.

The beams 13, 14 and 15 are made of a foam that may be energy absorptive but other compositions are also within the scope of the present invention. While the foam may comprise any suitable material, in a preferred embodiment illustrated, the foam comprises a mixture of isocyanate and resin, which is polyurethane commercially available from several sources. Advantageously, the beams 13, 14, 15, 17 and 19 are molded directly onto the backing layer 16 such that the beams are simultaneously formed and joined to the backing layer 16 in a single operation, which is described below in greater detail. Alternatively, the beams may be molded directly onto the substrate layer 18 if the backing layer 16 is eliminated.

In the preferred embodiment, the beams 13, 14, and 15 are joined by forming in one piece with the side beams 17 and 19. Such an arrangement forms a frame 25 of structural foam that rigidities the entire headliner assembly. Nevertheless, it is to be understood that beams according to the invention described in detail below can be formed individually without joining other beams, as desired, without departing from the scope and spirit of the present invention. In any event, at least one beam is formed to include a selected area surrounded by the foam forming the beam.

FIG. 3 shows a production line arrangement 28 according to the invention for forming the headliner assembly 10. The production-line arrangement 28 includes a component storage area 30, a loading station 32, a heating station 34, a forming station 36, a foam-in-place molding station 38, a cutting station 40, and a fixture installation station 42. The production-line arrangement 28 further includes a conveyor system 43, such as a chain conveyor, for transporting components between the loading station 32, the heating station 34 and the forming station 36.

Figure 4:
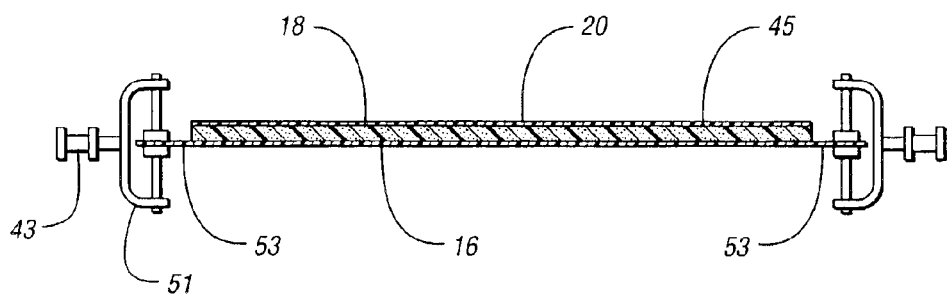
FIG. 4 is a cross-sectional view of a blank used to manufacture the headliner assembly, wherein the blank is supported by a frame.

In the preferred production line arrangement 28, the component storage area 30 preferably includes a source 44 of blanks 45, wherein each blank 45 comprises a substrate layer 18 with a backing layer 16 attached thereto. The component storage area 30 further includes a plurality of sources 46, 48 and 50 of cover layers, wherein each cover layer source 46, 48 and 50 contains cover layers that are different in color and/or composition compared with another of the cover layer sources 46, 48 and 50. At loading station 32, a blank 45 and a particular cover layer 20 selected from one of the cover layer sources 46, 48 and 50 are positioned in a transport frame 51 (FIG. 4). The frame 51 is then mounted on the conveyor system 43. An adhesive layer may also be positioned between the blank 45 and the cover layer 20 at station 32.

As shown in FIG. 4, the backing layer 16 of the blank 45 of the preferred embodiment preferably has an extended portion 53 that extends beyond the substrate layer 18 of the blank 45. Preferably, the transport frame 51 grips the extended portion 53 to thereby support the blank 45 and the cover layer 20 on the conveyor system 43. As another example, a conveyor system may be provided with upper and lower chains that grip the extended portion 53 therebetween. The substrate layer 18 of the blank 45 may be appropriately sized to closely match the final size or outline of the headliner assembly 10, to thereby reduce scrap or waste material. Of course, other transports may be used without departing from the invention. The blank 45 and the cover layer 20 are then transferred by the conveyor system 43 to the heating station 34 shown in FIG. 4.

The heating station 34 includes a platen assembly 54 having upper and lower heated platens that engage the blank 45 and the cover layer 20 to thereby heat the blank 45 and the cover layer 20. Preferably, the platen assembly 54 also has a plurality of thermocouples for sensing temperature of the blank 45 and the cover layer 20. Once sufficiently heated, the blank 45 and the cover layer 20 are transferred by the conveyor system 43 to the forming station 36.

The forming station 36 includes a first mold 56 having first and second mold portions for thermoforming the blank 45 and the cover layer 20 to form the main body 12, such that the main body 12 has a shape that corresponds to a desired shape of the headliner assembly 10. Preferably, both mold portions may also be chilled in any suitable manner, such as by circulating chilled fluid, such as water through the mold portions. The forming station 36 preferably includes multiple molds, similar to the first mold 56, that can be alternately used to form different headliner shapes and sizes.

The main body 12 is then transported manually or otherwise to the foam-in-place molding station 38.

The foam-in-place molding station 38 includes a second mold 58 for forming the foam beams on the main body 12, to thereby form the headliner assembly 10. The foam-in-place molding station 38 preferably includes multiple molds similar to the second mold 58 for forming various beam configurations on various headliner configurations as will be described below. As shown in FIG. 6, the mold 58 includes a first or upper mold portion 60, and a second or lower mold portion 62. The upper mold portion 60 has a mold surface 64 that corresponds with the formed shape of the cover layer 20, or the formed shape of a surface of the main body 12 to which the cover layer 20 is attached. The lower mold portion 62 has a mold surface 66 that corresponds with the formed shape of the backing layer 16 of the main body 12.

The lower mold portion 62 includes a plurality of cavities or recesses 68, 70, 72, 73 and 75 for respectively forming the beams 13, 14, 15, 17 and 19. Each of the recesses may be in fluid communication with one or more pour heads 74 that inject or otherwise introduce foam into the particular recess 68, 70, 72, 73 and 75. For example, as shown in phantom line in FIG. 6, each of the recesses is in fluid communication with at least one pour head 74, particularly if the recesses are separated from each other. Each of the recesses may also be in fluid communication with two or more pour heads 74. In the embodiment shown, where all recesses are in fluid communication with each other, a single nozzle or pour head may introduce the foam into the recess. Nevertheless, multiple pour heads may be used to expedite the introduction of foam to the mold 58. The pour heads 74 are connected to one or more sources of foam (not shown), such as a mixture of isocyanate and resin.

At molding station 38, the formed main body 12 is positioned between the mold portions 60 and 62, and the mold portions 60 and 62 are closed together. Next, foam is injected by the pour heads 74 into the recesses 68, 70, 72, 73 and 75. Because foam injected into the larger recesses 73 and 75 requires more time to expand and cure than foam injected into the smaller recesses 68, foam may preferably be first injected into the recesses 73 and 75, and subsequently into the recesses 68 when multiple nozzles are not available. As a result, expansion and curing of the foam may be arranged to conclude in all of the recesses at approximately the same time. The lower mold portion 62 may also be heated preferably in the range of 130° F. to 190° F. for isocyanate and resin to assist in the expansion and curing process of the foam, and to flash off water that may be associated with a mold-release agent applied to the mold parts such as sprayed on wax for an injection molding operation. The multiple pour heads feeding a particular one of the larger recesses may preferably inject foam simultaneously, or in closely spaced stages, so as to provide relatively consistent foam characteristics throughout.

In any event, the mid beam 14 includes a mid bar 84 that includes diverging beam portions that form or surround a component area 86 within the headliner. This is formed by an intermediate wall that diverges the fluid foam to border a selected component area. As a result, the beam provides structural support for and around an accessory component such as a dome light which may be installed above the headliner. Such a beam protects the accessory or permits mounting to the headliner by the surrounds or partially enclosed walls, without requiring separate construction or assembly after formation of the headliner.

Because the recesses 68, 70, 72, 73 and 75 or others may be separated from each other, the quantity or mass of foam per unit of recess volume delivered by the pour heads 74, which is referred to as injection density of the pour heads 74, can be varied from one to another of the recesses so as to vary the density of the resultant beams. For example, a larger quantity of foam per unit of recess volume can be delivered to narrower recesses 68, such that the resultant beams have a greater density. Consequently, foam density can be increased in areas requiring greater strength, such as areas of the headliner assembly 10 that will be remote from a side rail or roof supporting A-pillar joints of a motor vehicle. Furthermore, foam densities can be decreased in areas requiring less strength so that overall material costs can be significantly reduced. Different foam compositions may also be used under the method according to the invention to form beams having different densities.

The headliner assembly 10 may be precisely formed to achieve relatively close design tolerances with significantly fewer steps and assembly procedures. Because beams are not individually handled and stored, this method involves lower inventory, lower assembly costs and part handling costs compared with prior methods that separately form and install separate support structures and beams.

Moreover, components such as wiring harnesses, preformed foam components such as head impact energy absorbing, for example, pads meeting code standards such as FMVSS 201.a, foam cushions, or other accessories, may also form the intermediate wall. Components to be installed in the headliner may be positioned within the recesses in the cavity or shaped surface, of the female mold half as shown in FIG. 5, for embedding the component partially or completely in the beams formed in the mold. For example, as shown at 90, a wiring harness may be positioned in a predetermined location with respect to functional components to be installed after construction of the headliner. For example, the wiring harness 90 as shown in FIG. 9, extends into the component area 86 so that any component installed above or carried by the headliner may be provided with electrical power through the harness 90. Of course, the other end of the harness 90 is positioned for easy access to a power source or other coupling or connector in the electrical system, and may be made accessible to sources, coupling components or the like by cutting of the headliner assembly after the molding operation, for example, at cutting station 40 discussed below. Nevertheless, the method of constructing the foam beams also serves to embed and mount accessory components such as a wiring harness, energy absorbing member or other vehicle accessory components. Another example is shown at 100 where a plastic tube, for use as a rear window washer conduit, can be embedded in the foam. When the embedded component includes an end piece such as a coupler, the mold may include a dedicated recess that receives the coupling and protects it when the mold is closed.

In addition, it may be appreciated that numerous portions of a motor vehicle interior can be subject to numerous audio disturbances such as buzzes, squeaks or rattles that result from operation of components within the headliner or other parts of the vehicle that are transmitted through the roof panel during operation of the vehicle and its drivetrain. Accordingly, a separate foam pad, such as overhead pad 96, may be added on the back of the headliner assembly during the foam-in-place process to mute or dampen vibrations at areas subject to resonance or the transmission of audio disturbances. The pad 96 may be made of an acoustic foam that is absorbent of acoustic waves in the range of 0 hertz to 10,000 hertz. Accordingly, the mold may be modified to include additional channels 94, in fluid communication with or independent of the beam forming recesses, that are filled during the molding operation at workstation 38. These produce a foam pad mounted at selected locations to the headliner providing acoustic control or protecting against buzzes, squeaks and rattles as shown at 96 as predetermined to be desired. The pads may be secured to a main body 12 or other components of the headliner. Alternatively, the noise reduction pads may also be formed in recesses in fluid communication with channels for forming the foam beam so as to be made with the same pour heads used to inject foam into the beam forming channels. Preferably, as shown in the preferred embodiment of FIG. 7, the noise reduction pads are made from an acoustically absorbent foam, and may be smaller, thinner and thus less bulky than other portions of the structural beams, particularly when formed adjacent to, or within a peripheral frame formed by foam beams.

When the headliner assembly 10 is transferred to the cutting station 40, which is shown in FIG. 4, a computer controlled, water jet cutting device 80 trims the headliner assembly 10. Trimming may include cutting openings through the headliner assembly 10, for example, within the component area 86 or for communication or access to the couplers or terminals of the embedded wiring. The rigidity and dimensional stability is preferably closely matched to the final size or outline of the headliner assembly 10 so that the amount of trimming required is significantly reduced compared with prior methods of forming headliners. The headliner assembly 10 is then transferred to the fixture assembly station 42 where installation of such fixtures as coat hooks, dome lights, wire couplings and ornaments is completed. The headliner blank may also be trimmed before molding and foam introduction, particularly when couplings may be protected within the headliner during molding.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for forming a headliner comprising:
   forming a main body by shaping a substrate blank with a shape;
   positioning said blank in a mold having at least one mold surface conforming to said shape and said mold surface having a recess including an intermediate wall partitioning a portion of the recess;
   closing the at least one mold surface against said blank; and
   introducing foam into said recess to form a foam beam with a component area at said portion and to join said foam beam to said blank.

2. The invention as described in claim 1 wherein said positioning comprises enclosing a component location on said blank within said recess.

3. The invention as described in claim 2 wherein said enclosing comprises diverging channels in the mold half to form said recess about said component location.

4. The invention as described in claim 1 wherein said positioning comprises including a component position area.

5. The invention as described in claim 4 wherein said enclosing comprises surrounding a component position area.

6. The invention as describer in claim 1 wherein said intermediate wall is a vehicle accessory to be at least partially embedded.

7. A method for forming a headliner comprising:
   forming a main body by shaping a substrate blank with a shape;
   positioning said blank in a mold having at least one mold surface conforming to said shape and said mold surface having a recess extending across a major dimension of said shaping;
   applying a component in alignment with at least a portion of said recess to one of said substrate and a surface of said mold recess;
   closing the at least one mold surface against said blank; and
   injecting foam into said recess to form a foam beam and embedding said component at said portion of said recess, and joining said foam beam to said blank.

8. The invention as described in claim 7 wherein said applying a component includes aligning said component in a predetermined location in said recess.

9. The invention as described in claim 8 wherein said location includes alignment pins and aligning comprises engaging said component against said alignment pins.

10. The invention as described in claim 7 wherein said component is a wiring harness.

11. The invention as described in claim 7 wherein said component is a hose.

12. The invention as described in claim 7 wherein said applying comprises attaching a component to said substrate.

13. A method for forming a headliner comprising:
    forming a main body by shaping a substrate blank with a shape;
    positioning said blank in a mold having at least one mold surface conforming to said shape and having a first recess extending across a major dimension of said shaping, and at least one second recess;
    closing the at least one mold surface against said blank;
    injecting foam into said recess extending across said major dimension to form a foam beam and to join said foam beam to said blank; and
    injecting an acoustic foam into said at least one second recess to form a foam pad in contact with said substrate.

14. The invention as described in claim 13 wherein said second recess is independent of said first recess and injecting a flexible foam is said injecting acoustic foam step.

15. The invention as described in claim 14 wherein said at least one second recess is in fluid communication with said first recess.

16. A method for forming a headliner comprising:
    forming a main body by shaping a substrate blank with a shape;
    positioning said blank in a mold having at least one mold surface conforming to said shape and having a recess extending across a dimension of said shaping;
    applying a component in alignment with at least a portion of said recess to one of said substrate and a surface of said mold recess;
    closing the at least one mold surface against said blank; and
    injecting foam into said recess to form a foam beam and embedding said component at said portion of said recess, and joining said foam beam to said blank, wherein said applying a component includes aligning said component in a predetermined location in said recess, wherein said location includes alignment pins and aligning comprises engaging said component against said alignment pins.

* * * * *

UNITED STATES PATENT AND TRADEMARK OFFICE
CERTIFICATE OF CORRECTION

PATENT NO.   : 6,939,491 B2
DATED        : September 6, 2005
INVENTOR(S)  : Bari William Brown et al.

It is certified that error appears in the above-identified patent and that said Letters Patent is hereby corrected as shown below:

Column 7,
Line 65, delete "describer" and insert -- described --.

Column 8,
Lines 7, 33 and 53, delete "shaping" and insert -- blank --.

Signed and Sealed this

Fourteenth Day of February, 2006

JON W. DUDAS
*Director of the United States Patent and Trademark Office*